United States Patent Office 2,714,055
Patented July 26, 1955

2,714,055

PROCESS OF PRODUCING INCREASED YIELDS OF TAR-FREE CARBON BLACK

Martin R. Cines, Bartlesville, Okla., and Joseph C. Krejci, Phillips, Tex., assignors to Phillips Petroleum Company, a corporation of Delaware Application December 27, 1949, Serial No. 135,084

14 Claims. (Cl. 23—209.4)

This invention relates to the production of carbon black. In one specific aspect it relates to the production of tar-free carbon black in an increased yield per unit of hydrocarbon feed, and per furnace, by producing larger quantities of tarry carbon black than the maximum possible production of tar-free carbon black and then detarring the tarry carbon black to produce said tar-free carbon black. This process is only applicable to the making of carbon black in a furnace in which an axial stream of hydrocarbon in gaseous form surrounded by a helically moving blanket of hot gas is passed axially into a reaction zone, because only in such processes can the amount of hydrocarbon in said axial stream be greatly increased without such deposit of carbon occurring, or without the flame being extinguished in the furnace, so that only in these processes is enough tarry carbon black produced to result in an increased yield per unit of hydrocarbon feed, and per furnace, after said tarry carbon black has been detarred.

Such carbon black processes are disclosed and claimed broadly in a patent to Joseph W. Ayers Re. 22,886 of June 3, 1947. The helically moving blanket of hot gas may be formed by injecting air tangentially into a cylindrical furnace containing an axially moving stream of hydrocarbons in gaseous form, which hydrocarbons may be vaporized liquids or gases, the heat being supplied by the burning of a portion of the axially moving hydrocarbons. Alternatively air and fuel may be injected tangentially and burned to form the hot helical blanket, or air and fuel may be burned and the hot combustion gases injected tangentially. Pure oxygen, or other free-oxygen containing gas can be substituted for the air. Such specific processes are disclosed in Application No. 577,180 filed April 29, 1945 (now abandoned) and Application No. 743,893 filed April 25, 1947 by Joseph C. Krejci now U. S. Patent 2,564,700, August 21, 1951.

Since making the present invention our attention has been directed to the patent to George L. Heller and Carl W. Snow 2,238,576 of April 15, 1941, which patent states (on page 1, col. 2, lines 19 to 31) that a high yield of carbon black is produced by incomplete combustion of natural gas in a plurality of alternate thin wide contacting sheets of burning gas and air forming thin viscous flame fronts which flames move forwardly through the combustion chamber in parallel streamline non-turbulent relation, and which states (on page 4, col. 1, lines 51 to 77) that the quality of the carbon black is protected by producing a solid hydrocarbon black having an acetone extractable content preferably in the range of 2 to 5 per cent but without claiming any increase in the yield of carbon black per unit of hydrocarbon feed, or per furnace. On page 6, col. 1, lines 53 to 69 Heller states that he can remove the tarry substances with hot acetone, or by prolonging heat treatment if desired, but because of the nature of Heller's process there could be no increased yield of tar-free carbon black per unit of hydrocarbon feed, or per furnace, because the velocity of gas and air in the combustion chamber must average fourteen feet per second, as stated on page 3, col. 2, last paragraph, and it is impossible to greatly increase the amount of hydrocarbon entering said furnace without creating turbulence and destroying the streamline flow and thin viscous flame fronts; with resulting excessive carbon deposits in said reaction zone and blowing of the flames out of said reaction zone, said flames thereby becoming extinguished and the furnace rendered inoperative.

In contrast in the present process the axial stream of hydrocarbon in gaseous form and the surrounding helically moving blanket of hot gas are both moving at such velocity (over 100 feet per second) so that their flow is turbulent and any flames in the furnace are turbulent and violent in nature as contrasted to the viscous streamline laminar flames in Heller, so that in the present process the rate of feeding the axial stream of hydrocarbon can be greatly increased without disturbing the process except that the carbon black produced will contain an excessive amount of tar but will be produced in such quantity that after it has been detarred more tar-free carbon black has been produced per unit of hydrocarbon feed and per furnace.

Furthermore, we unexpectedly obtain greatly increased yields of tar-free carbon black per unit of hydrocarbon feed and also per furnace by use of the present process.

One object of this invention is to produce an increased yield of tar-free carbon black per unit of hydrocarbon yield.

Another object is to produce an increased yield of tar-free carbon black per furnace.

Another object is to produce carbon black having qualities desirable in compounding with a rubber selected from the group comprising natural rubber, and rubbery polymers obtained by polymerizing a conjugated diene.

Numerous other objects and advantages will be apparent to those skilled in the art upon reading the accompanying specification, claims and drawings.

In the drawings:

Figure 3 is a fragmentary cross sectional view of the inlet portion of one form of carbon black furnace suitable for use in Figure 2 in carrying out the invention.

Figure 4 is a cross sectional view of Figure 3 taken along the plane of pipes 22, looking downstream into reduced diameter zone 28.

Figure 1:
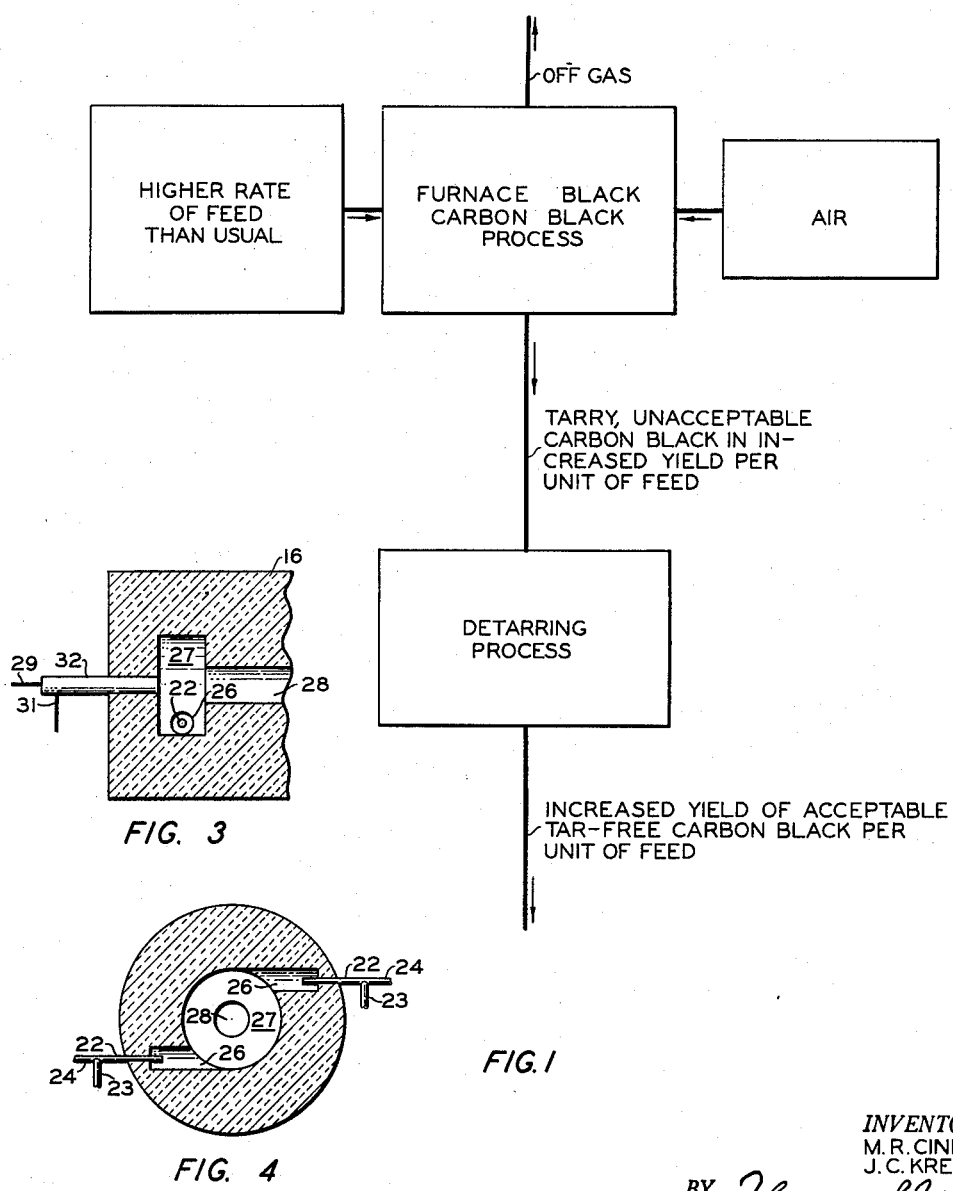
Figure 1 is a flow chart showing the relationship of the steps of the process.

As shown in Figure 1, the present invention comprises a furnace black carbon black producing process which is operative with air and at a higher rate of feed than usual, which process produces a tarry unacceptable carbon black in increased yield per unit of feed. The tarry carbon black is detarred with a resultant increased yield of acceptable tar-free carbon black per unit of feed and per furnace.

Figure 2:
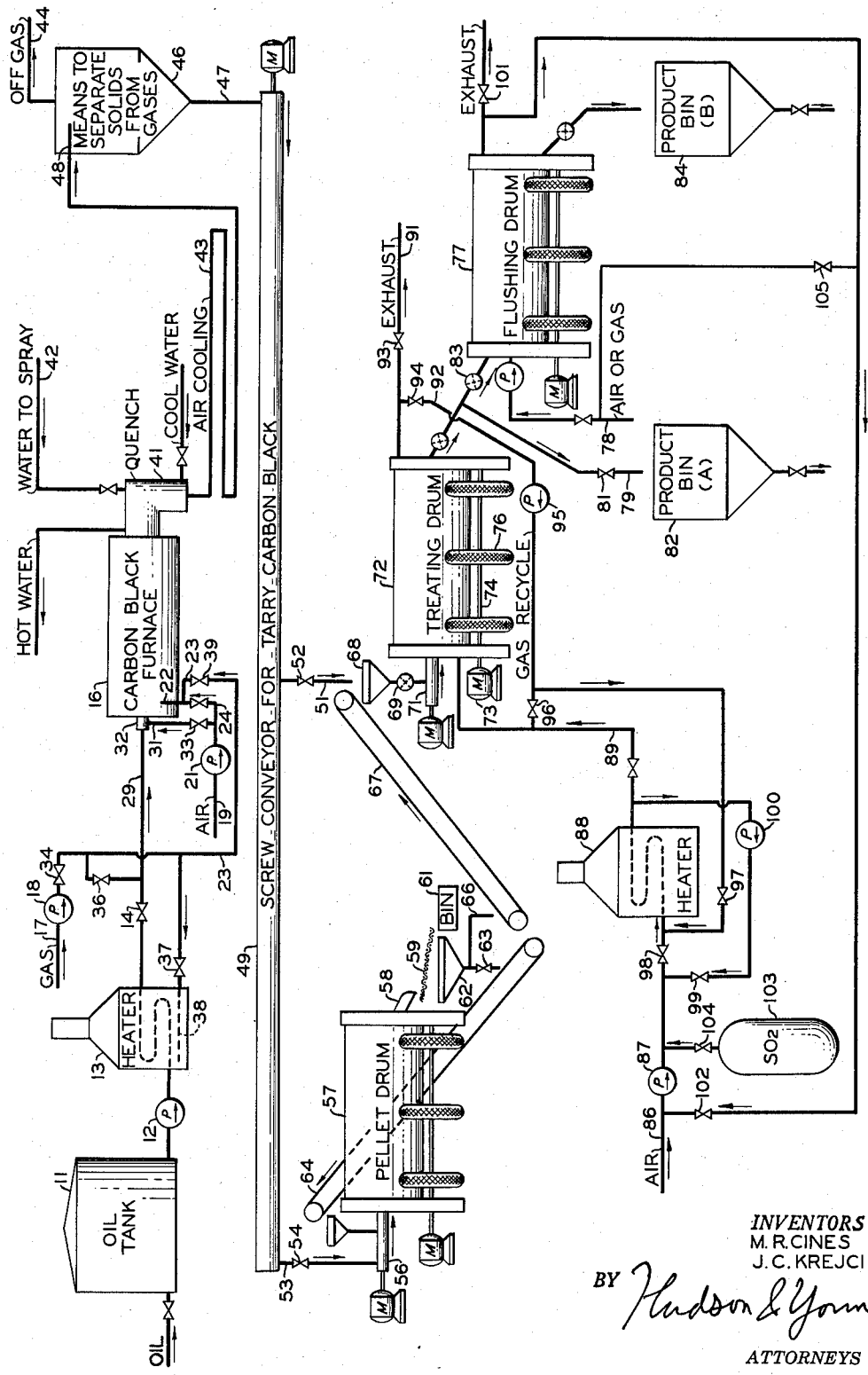
Figure 2 is a schematic diagram with the parts shown by conventional symbols of a carbon black producing plant embodying the present invention.

In Figure 2 suitable apparatus is shown for carrying out the process outlined in Figure 1. In Figure 2 the process will be described with relation to the use of oil as the axial hydrocarbon, and the use of a mixture of burning air and gas added tangentially and forming combustion gases in a carbon black furnace having the construction shown in Figures 3 and 4 to form the helically moving blanket of hot gas; but this is done merely for purposes of illustration, and other hydrocarbons in gaseous form surrounded by a helically moving blanket of hot gas, however the same may be produced, can be used in the practice of the present invention.

In Figure 2 oil from storage tank 11 is pumped by pump 12 through heater 13 where it is heated to such a temperature that when it passes through pressure reducing valve 14 it is introduced into carbon black furnace 16 in the form of an axial stream of hydrocarbon in gaseous form. At the same time fuel, which may be liquid or powdered fuel (because the fuel merely supplies heat and does not generally turn into carbon black in this process, but which fuel preferably is gas 17), is pumped by pump 18 along with a sufficient amount of air 19 pumped by pump 21 tangentially into furnace 16 through pipe 22. As shown in Figures 3 and 4, the gas from pipe 23 mixes with the air from pipe 24 and burns as it emerges from tangentially directed pipe 22 in tunnels 26 and/or in the enlarged cylindrical bore 27 of furnace 16, preferably so that the gas from pipe 23 is completely combusted before the resulting hot combustion gases which spiral inwardly toward the axis of chamber 27 contact the axial stream of hydrocarbon from 32. Then said spiralling hot gases pass as a helical blanket down cylindrical bore 28 as a sheath around the axially moving vaporized oil from heater 13 which is entering furnace 16 through axially disposed pipe 29, which vaporized oil passes centrally through the rotating gas.

In the illustrative example shown in the drawing, oil 11 is preferably a gas oil in the neighborhood of 18° A. P. I. gravity comprising aromatic hydrocarbons to the extent that said gas oil has an aniline number of less than 150° F. (and the lower the aniline number the better), gas 17 is more than 50 per cent methane, and possibly more than 85 per cent methane, while ordinary air is used at 19, but the scope of the invention is not limited thereto, as any hydrocarbon in gaseous form can be used as the axial stream injected in 29, and air alone, or free-oxygen containing gas, or mixtures of the same with any fluid fuel of a liquid, gaseous, or of granular nature, may be injected in 22 to form the helical blanket of hot gas around said axial stream in the furnace 16, and the furnace may have other interior configurations (not shown), for example, the cylindrical portion 27 may extend the full length of the furnace without having any reduced diameter portion 28, or there may be an orifice of a number of different shapes or sizes restricting a portion of the furnace chamber 27 without departing from the present invention. In practice the addition of some air (or other free-oxygen containing gas) through pipe 31 to an annular space 32 surrounding pipe 29 is found to have value in preventing deposition of carbon on the end to tube 29, but it is not essential. The amount of such air can be varied by adjusting valve 33, or it can be shut off thereby.

By closing valve 34 and opening valve 36 the fuel supplied through line 23 becomes oil 11 instead of gas 17, while by opening 36 and 34 and closing valve 14 the axial hydrocarbon 29 can be shifted to gas. By proper adjustment of the pressures of pumps 12 and 18 and the position of valves 14, 34 and 36, a mixture of gas and oil may be employed as axial stream 29. When oil is employed as fuel in line 22 it need not be the same quality as that employed as carbon black feed stock in line 29. Whatever fuel is employed in line 23 can be supplied through valve 37 to burner 38 to supply heat for heater 13. By closing valve 39 the material injected through line 22 may be limited entirely to a free-oxygen containing gas such as air.

The axial stream of hydrocarbons in gaseous form passing into the reaction zone of carbon black furnace 16 surrounded by a helically moving blanket of hot gas is subjected to pyrochemical reaction by the heat of the surrounding blanket of gas so that a portion of the hydrocarbon is converted to carbon black which carbon black forms as suspended particles in the resulting gases. These resulting gases are cooled by any suitable means in the art, such as indirect heat exchange water jacket cooling 41, internal quench, water spray, cooling 42 and/or indirect heat exchange air cooling 43. The particles of carbon black are separated from the off-gas 44 in any suitable means to separate solids from gases 46. In large scale commercial operations in plants having dozens of furnaces 16, separator 46 generally comprises an electrical precipitator and some cyclone separators in series in the order named, however bag filter means and a number of other well known separating means can be used instead which reduces the investment if the plant has few furnaces. The separated carbon black emerges from the bottom of the separator 46 through pipe 47. For purposes of conventional representation separator 46 is shown in the form of a cyclone separator having tangential introduction pipe 48, but unless the cyclone separator is carefully chosen as to size, it generally will not alone separate out all of the finer carbon black. However if an electrical precipitator is employed first, the smaller particles will be gathered together into larger particles by the electrostatic charges received in the precipitator, which larger particles can be separated very easily by almost any type of cyclone separator.

In order to make as much of the flow in the drawing go from left to right, so that the drawing is easier to read, a long screw conveyor 49 is shown for shifting the compound black 47 to the left in the drawing, but actually screw conveyor 49 is not necessary from a process standpoint.

The process is operated with a greatly increased amount of hydrocarbon in axial stream 29 over that which will make tar-free carbon black in furnace 16, so that as a result carbon black 47 is tarry, and it is necessary to deter the same. The remainder of Figure 2 is devoted to suitable apparatus and processes for producing a tar-free carbon black acceptable to the rubber industry for compounding with a rubber selected from the group comprising natural rubber, and rubbery polymer obtained by polymerizing a conjugated diene, characterized by the fact that a standard chloroform extract of tar from said carbon black will transmit at least 85 per cent as much light as a chloroform sample used in the extraction will before making the extraction.

The term "rubbery polymer obtained by polymerizing a conjugated diene" as employed in this specification is intended to cover polymers of butadiene, piperylene, isoprene, chloroprene, alone or with one or more of each other, and in some instances with comonomers polymerizable therewith such as styrene, acrylonitrile and the like, and these polymers may contain minor but effective amounts of methyl methacrylate and the like to stiffen the same, but these polymers are all rubbery in nature.

For the purpose of the present specification the standard chloroform extract of tar from said carbon black is obtained in the following manner:

The tar content of carbon black is determined by mixing 2 grams of black with 50 cc. of chloroform, boiling the mixture, filtering, and determining the percentage light transmittance of the filtrate as compared with the transmittance of a blank sample of chloroform. The comparison is preferably conducted with a photoelectric colorimeter such as a Lumetron colorimeter at a wave length of 440 mu, a light intensity of 20, and a cell 1 cm. long. A tar-free black is arbitrarily defined as one that shows a transmittance greater than 85 per cent according to this procedure. Most commercial product specifications are more or less arbitrary, and this one is no exception. Acetone is sometimes substituted for chloroform in the test procedure. The per cent transmittance equivalent to 85% with chloroform is about 92% with acetone. The original acetone or chloroform used for the test should be substantially colorless.

The tar content of a carbon black depends on the temperature and the reaction time at which the black is produced. At a constant temperature, tar content increases as reaction time decreases. At a constant reaction time, tar content decreases as temperature increases. Temperature and reaction time are inter-dependent in this respect. The specific temperature and the specific reaction time in any specific case will depend on furnace design, on the chemical properties of the feed, on the fuel-air mixture used, and on the ratio of axial to tangential feed. Specific data for obtaining tarry black and tar-free black from a certain feed and in a certain furnace are given in examples below. For a given feed, a given furnace, a given tangential fuel-air mixture, and a given feed rate for the fuel-air mixture, increasing the oil feed rate above a certain value will decrease the reaction time and the temperature and increase the tar content and the yield of carbon black. As the oil feed rate is increased further, a value will be reached at which the carbon black yield will decrease and production of cracked hydrocarbons will become increasingly evident. The specific conditions for this maximum yield of carbon black will vary in accordance with the conditions previously discussed.

It is believed that one skilled in the art can, by applying the principles and the test method discussed in the preceding paragraphs, readily produce an increased yield of tarry carbon black from any given feed with any given apparatus.

The tarry carbon black moving down screw conveyor 49 is removed at 51 by operating valve 52 if it is desired to produce a more or less flocculent black as a product, but in a number of cases it is desired to produce a pelleted black and therefore valve 52 is closed and the tarry black 47 moves to the end of conveyor 49 and emerges through pipe 53 controlled by valve 54 into the screw conveyor 56 of pelleting drum 57. Considerable difficulty in pelleting some kinds of tarry black may be experienced unless the pelleting process disclosed by Merton Studebaker in application Serial No. 589,811, filed April 23, 1945, now U. S. Patent 2,503,361 April 11, 1950, is followed in drum 57. Other tarry blacks pellet by mere one trip passage through the drum.

Briefly in said pelleting process drum 57 rotates and is about 10 to 25% full of a mixture of pellets and flocculent black in the form of a bed. Drum 57 is smooth and cylindrical and as it rotates, part of the mixture is carried up on one side of the drum by friction until the angle of repose of the carbon black mixture therein is exceeded whereupon the carbon black cascades and tumbles with a rolling motion down and across the bed to the low side of the bed. Pellets are preferably constantly withdrawn through chute 58 and all are passed through screen 59 which is merely to remove mill scale and occasional large masses of solidified carbon black into a trash bin 61. All sizes of pellets go through screen 59 into hopper 62 where a desired proportion of the pellets are preferably recycled by adjusting valve 63 so that they may be carried back by belt 64 into feeding means 56. With some carbon blacks the recycle can be eliminated by closing valve 63. At the same time a proportion of finished pellets pass through pipe 66 onto belt 67 into hopper 68. Hopper 68 also is adapted to receive flocculent carbon black 51 when valve 52 is open, with any desired amount of pellets from 67 or without any pellets when valve 54 is closed. Whether the feed in hopper 68 is straight pellets from 67 or straight flocculent carbon black from 51 or a mixture from both does not change the operation of the tar removing treatment which will now be discussed.

We have now discovered that large enough percentages (by weight) of tar can be removed from carbon black to make a suitable tar removal process for use with the present invention, by employing the same processes which were developed for decreasing the pH, increasing the scorch time, and/or hardening carbon black pellets and are described in application Serial Nos. 67,674 filed December 28, 1948 and 87,473 filed April 14, 1949 by Martin R. Cines now U. S. Patents 2,682,448 June 29, 1954 and 2,641,535 June 9, 1953, respectively. The process of No. 67,674 gives a more complete removal of tar than that of No. 87,473, but in many cases the later process gives sufficient tar removal for the purposes for which the carbon black is being made. As these two processes are fully described in said two applications a brief description will be sufficient in the present application.

It is entirely possible from a commercial standpoint to detar carbon black with chloroform or acetone as suggested by Heller 2,238,576 patented April 15, 1941, but the gas treatments briefly described herein are much cheaper and generally much more satisfactory, because the tar is actually converted to carbon black to a large extent instead of being removed by a solvent, and the problem of extracting the tar from the liquid solvent is thereby obviated while the yield is slightly increased. However, the large increase in yield in the present process is not due to this minor increase caused by using gas, as tests in which the tar was removed by chloroform or acetone clearly will show that there is a substantial and unexplained increase in the amount of carbon black produced regardless of how the tar is extracted.

In Figure 2 the carbon black from hopper 68 passes through a rotating star wheel air lock 69 of conventional design and through a motor driven screw feed 71 into a treating drum 72. Drum 72 is rotated by motor 73 driving shaft 74 and wheel 76 which engage drum 72 by frictional contact (and the same means is used to rotate the pellet drum 57 and the flushing drum 77). After the carbon black has spent a minimum average time in the treating drum 72 it is discharged through suitable star valves into drum 77 where the treating agent may be flushed out by air, inert gas, or a secondary gas treating agent from line 78. However, in many instances, especially when air is used as the primary treating agent in treating drum 72, it is only necessary to draw off the carbon black through pipe 79 controlled by valve 81, while valve 83 is closed and stationary. Obviously if the temperature in treating drum 72 is above the ignition temperature for the carbon black in the open air, then pipe 79 should be long enough and small enough in diameter to provide sufficient air cooling so that the carbon black going into product bin (A)82 will not catch fire, and obviously some form of heat exchange such as a water jacket (not shown) can be provided for cooling the carbon black in pipe 79 below the air ignition temperature.

When valve 81 is opened, valve 83 is stationary, but if it is desired to flush the product and place the same in product bin (B)84 then valve 81 is closed and star valve 83 is rotated.

As drums 72 and 77 rotate gases are passed through the same. The simplest treatment involves taking air from 86, pumping it at 87, heating it at 88 to a temperature ranging from 400° F. to 1200° F. The preferred temperature range is from 600° F. to 1000° F. The air so heated in heater 88 passes through pipe 89, drum 72 and out the exhaust 91. In such a treatment the average time of the pellets in the treating drum 72 should be in the neighborhood of one hour.

While it is possible under excellent heat transfer conditions to operate with undiluted air at these elevated temperatures, under normal conditions an excessive amount of carbon black is lost through oxidation especially at the higher temperature. For such elevated temperatures it is better to operate with diluted air having an oxygen content between 2.5 and 5 per cent which can be obtained by recycling the oxygen depleted air in 91 to the desired extent through pipe 92 which is accomplished by pump 95 and by adjusting valves 93 and 94. At the same time the gas recycle can be preheated to the desired amount and used as a temperature control by adjusting valves 96 and 97 to recycle as much as desired through heater 88. Furthermore, by adjusting valves 98 and 99 and the pressure of pump 100 the amount of new air added and the amount which it is preheated can be regulated.

With such a treatment it is merely necessary to cool the carbon black in pipe 79 below the ignition temperature, but if it is desired to be sure that further oxidation is completely prevented the carbon black with sufficient cooling (not shown between 72 and 77) is passed into flushing drum 77 and flushed out with an inert gas such as nitrogen, carbon dioxide, or perhaps hydrogen, or even air at a low enough temperature to be substantially inert, which inert gas may be exhausted through valve 101 or recycled through valves 102 or 105 or both, to the degree depending on the adjustment of the respective valves. Cooling can also occur by radiation of heat from drums 57, 72, and 77, and inert gas 78 can be a cooling agent in drum 77.

In order to decrease the time of treatment and to operate at a considerably lower temperature it is often desirable to add a suitable oxidation catalyst, sulfur dioxide being greatly preferred. These benefits are attained at some sacrifice of tar removal and are therefore attainable only in those cases where greater tar content can be tolerated. The sulfur dioxide is added preferably as a vapor from tank 103 through valve 104 during the same operations already described to the amount of 0.1 to 5 volume per cent of sulfur dioxide in the stream 89. Optimum results are obtained with 0.5 to 1.5 volume per cent of sulfur dioxide. It is necessary however that some air or other free-oxygen containing gas be added at 86 and although greater or smaller amounts may be used I prefer to use 5 to 50 cubic feet of air per pound of black and to maintain contact between the black and air for a sufficient time to attain the desired detarring which may occur in as little time as ten minutes to one hour as the average time the carbon black is in drum 72 although treating times outside this range may be used. The desired effects are obtained with sulfur dioxide additions at temperatures between 300° F. and 400° F. The maximum tar removal with $SO_2$-air treatment at 350–400° F. produces a photometric value of 82.

While Figure 2 shows a pellet drum 57 separate from the treating drum 72, obviously the two can be combined in one. For example by closing valve 54 and opening valve 52, operations in drum 72 can either be detarring of flocculent carbon black, or, by speeding up the rotation of drum 72, increasing the time the carbon black spends in the drum, and/or by adding a recycle (not shown) like 64, partial, or complete pelleting of the carbon black can be accomplished at the same time as the carbon black is being detarred. When drum 72 is heated above 300° F. the recycle system (not shown) becomes quite complex, as to minimize loss of carbon black due to oxidation the recycle (not shown) should be a system entirely enclosed from the atmosphere and preferably taking the carbon black from pipe 79 above valve 81 and carrying the same by an enclosed belt like 64 to an enclosed connection (not shown) to the pipe below star valve 69.

In either the sulfur dioxide or straight air methods described above the air 86 can be modified by the addition of other gases such as oxygen, nitrogen, and/or the recycled gases in pipe 92 without departing from the invention.

EXAMPLE A

Carbon black was produced by pyrochemical reaction as described above of an 18° A. P. I. gravity gas oil in a cylindrical furnace without any enlarged section at a reaction temperature in the range of 2400–2700° F. The furnace was 9½ inches in diameter and 46 inches long. It was provided with three tangential inlets for air and a one-half inch axial inlet for oil. The one-half inch oil inlet was jacketed with a one-inch pipe for introduction of air to prevent coke deposition on the oil inlet. The oil was preheated and vaporized at 700° F. before introduction into the furnace. The effluent from the furnace was passed into conventional cooling and recovery equipment for collection of the carbon black product. The data obtained are shown in the following tabulation:

*Table I*

| Run | Oil Feed Rate (G. P. H.) | Air Feed Rate (C. F./hr.) | | Carbon Black Yield (lb./gal. of oil) | Duration of run, hr. |
| --- | --- | --- | --- | --- | --- |
| | | Tangential | Jacket | | |
| B621 | 32.0 | 12,000 | 1,000 | 3.86 | 2.1 |
| B625R | 38.2 | 14,000 | 1,400 | 4.00 | 1.5 |

A sample of the carbon black produced in each of the two runs was extracted with chloroform. The chloroform extract from the carbon black of run B621 was colorless, indicating that the carbon black contained substantially no tar. The chloroform extract from the carbon black of run B625R was yellow, indicating an appreciable tar content; in fact, the tar content was above the maximum commercial specification as defined above of at least 85% light transmission.

The carbon blacks from both runs are separately treated with a gas consisting of 97 volume per cent nitrogen and 3 volume per cent oxygen. The gas flows upward through a fluidized bed of the carbon black at the rate of 59 cubic feet per pound of carbon black per hour. The following data are obtained:

*Table II*

| Carbon Black from run | Temperature, °F. | Time, hr. | pH | | Loss, Percent |
| --- | --- | --- | --- | --- | --- |
| | | | Initial | Final | |
| B621 | 840 | 1 | 9.6 | 6.0 | 3 |
| B625R | 800 | 1 | 9.5 | 6.0 | 1 |

From calculations based on Table I and Table II it is apparent that run B621 produced low-pH, specification carbon black at the rate of 117 pounds per hour, whereas run B625R (this invention) produced a similar product at the rate of 152 pounds per hour. This is an increase of 30 per cent in production for a 19 per cent increase in oil feed rate. The treated black from run B625R (pH=6.0) is tar-free. Furthermore a temperature of 840° F. is required to reduce the pH of the black from run B621 from 9.6 to 6.0 in one hour, whereas a lower temperature (800) produces a comparable pH decrease with the black from run B625R (this invention) in the same time. Also, the oxidation loss is lower in run B625R.

EXAMPLE B

It is known that present carbon black operations are adjusted to yield an essentially tar-free product. It is also known that the throughput of the furnaces could be increased, increasing the yield of black per gallon of feed, without interfering with the operation of the furnace. However, the resulting product from this increased feed rate is not acceptable because of excessive residual tars. It has been shown that by high temperature (800–900° F.) oxidation of the surface of carbon blacks, various physical properties of the black can be modified. In the course of the oxidation studies, it was also established that all residual tars, as determined by chloroform extraction tests, were destroyed.

This invention consists of a process in which the carbon black furnace is operated at the maximum feed rate consistent with maintaining the furnace walls free of carbon deposits. The product from the furnaces are then subjected to an oxidative after-treatment with air at temperatures between 600–900° F. in which the residual tars are destroyed. In addition, the surface complex of the black is increased and the pH lowered.

The oxidation treatment may be carried out at lower temperatures than surface oxidation treatments for tar-free blacks. The following data on a tarry black (P–180) prepared at 210 gal./hour feed rate by the pilot plant at the Philtex Experiment Station show the tar removal as a function of temperature. The tangential air rate was 125,000 cubic feet air/hour, and the rate of the tangential gas was 8300 C. F. H.

Table III
DE-TARRING OF CARBON BLACK OF EXAMPLE B

| Run | Temp. | Contact Time, Min. | pH | Air Feed, C. F./#Black | Percent Light Transmittance, 10 mm. Cell | Percent Tar Removed |
|---|---|---|---|---|---|---|
| P-180 | No Treatment | | 10.8 | | 47 | 0 |
| 3425-38 | 300 | 60 | 9.1 | 64 | 56 | 6 |
| 3425-37 | 300 | 120 | 8.9 | 128 | 56 | 6 |
| 3425-40 | 400 | 30 | 8.7 | 32 | 59 | 14 |
| 3425-39 | 400 | 60 | 8.7 | 64 | 65 | 30 |
| 3425-41 | 500 | 60 | 8.8 | 64 | 79 | |
| 3425-42 | 600 | 60 | 7.8 | 64 | 86 | |
| 3352-P-180 a | 880 | 20 | 6.0 | 5.3 | b 100 | b 100 | a Run in glass kiln, other data are from small glass circulating bed apparatus.
b Estimated—based on statement that chloroform extract was water white.

As an example of the effect of de-tarring by oxidation on overall plant operations, the following data from pilot plant operations are presented:

Table IV

| Date | Tar Free Run | Tarry Run | Increase, percent |
|---|---|---|---|
| Feed rate, gal./hr | 180 | 210 | 15.3 |
| Yield, lbs./gal | 3.27 | 3.77 | |
| Total productivity, lbs./hr | 590 | 791 | 34.1 |
| pH of product | 9.8 | 10.2 | |
| Scorch time, min | 19 | 19 | |
| pH after treatment (20 min., air, 880° F.) | | 6.0 | |
| Scorch time after treatment, min | | 29 | |

The de-tarring step does not cause any appreciable loss in yield.

It will be seen from Table IV that an increase of 15.3 per cent in the feed rate of gas oil results in an increase of 34.1 per cent in the yield of carbon black in pounds per hour per furnace, and at the same time the yield in pounds of carbon black per gallon of oil feed went from 3.3 pounds per gallon to 3.8 pounds per gallon, an increase of 15 per cent per unit of hydrocarbon feed.

EXAMPLE C

The following Tables V, VI and VII show further the beneficial effects of the present invention. The pH of the carbon black has a relation to the time of scorch as a carbon black with a high pH cannot be worked very long without scorching the same.

Table V

| Air-gas Ratio tang. feed | Max. oil rate for tar-free product, G. P. H. | CB, lbs./gal. | Tang. Air Rate, C. F. H. |
|---|---|---|---|
| 8 | 80 | 3.40 | 125,000 |
| 9 | 110 | 3.60 | 125,000 |
| 10 | 135 | 3.75 | 125,000 |
| 12 | 155 | 3.47 | 125,000 |
| 14 | 170 | 3.43 | 125,000 |

Table VI

| Air-gas Ratio tang. Feed | Oil rate | Color of CHCl₃ Extract | CB, lbs./gal. | Tang. air Rate, C. F. H. |
|---|---|---|---|---|
| 15 | 140 | Clear | 2.77 | 125,000 |
| 15 | 160 | do | 3.01 | 125,000 |
| 15 | *177.5 | | | |
| 15 | 180 | Clear | 3.27 | 125,000 |
| 15 | 185 | do | 3.43 | 125,000 |
| 15 | 190 | L. Yel | 3.33 | 125,000 |
| 15 | 200 | Yel | 3.51 | 125,000 |
| 15 | 210 | D. Yel | 3.77 | 125,000 |

*Predicted maximum possible oil rate (not tested).

Table VII

| Run No. | Vol. Percent SO₂ | Treating Time, Hrs. | ft.³ gas/#black | Temp. | pH | Percent light* | Tar Removed |
|---|---|---|---|---|---|---|---|
| 3513-34 | 2.5 | 1.0 | 33.9 | 305 | 3.8 | 76.1 | 64 |
| 3513-35 | 1.14 | 1.0 | 34.7 | 355 | 3.3 | 81.1 | 72 |

*440 mu filter, 10 mm. rectangular cell, light intensity of 20.

Whereas in the laminar viscous flame method of said Heller Patent 2,238,576 it is necessary that the absolute velocity of gas passed through the combustion zone shall average in the neighborhood of 14 feet per second and can not be varied by any substantial amount, in contrast, in the present process, the hydrocarbon in gaseous form passing axially through the furnace moves several hundred feet a second in the production of tar-free carbon black and this velocity is greatly increased in producing increased quantities of tarry black. While the exact velocity will vary somewhat according to the air rate, gas rate (if fuel gas is employed tangentially) the type of black being produced, the type of hydrocarbon (such as gas oil or gas) being passed axially through the furnace and the reactor dimensions, the velocity of the axially moving hydrocarbon is in the range of several hundred feet a second. However, it is easy for the operator to increase the axial feed of hydrocarbons until a tarry black is produced, and this does not require experimentation.

EXAMPLE D

For example, in a furnace of the type shown in the present drawings having a 12-inch diameter reaction section 28, which is 11 feet long, and using as tangential feed through pipe 22 about 125,000 cubic feet of air per hour and 8,300 cubic feet of gas per hour with an axial feed through pipe 29 of 180 gallons per hour of 100° F. aniline number gas oil, a tar-free black was produced. Upon increasing the axial feed to 210 gallons per hour an increased yield of tarry carbon black per unit of feed and per furnace was produced in such quantity as to reduce the cost of producing a final tar-free carbon black from about one-fourth to one-half cents a pound even after the added expense (including additional plant equipment) of detarring the carbon black was added to the cost of the product.

It is impractical to give exact limits but the operator of the furnace can easily vary the conditions and produce a tarry black in increased yield and still not increase the axial feed of hydrocarbon to such a point that the furnace becomes too rapidly clogged by carbon deposits. Even atmospheric conditions affect the operation of the furnace and it is common operating practice to observe furnace operating conditions from time to time and to make corresponding adjustments without invention as such is within the skill of the ordinary furnace operator.

While specific examples have been given and specific apparatus has been shown, these have been disclosed for purposes of illustration of the invention, and the best mode of practicing the same, and should not be regarded as limiting the scope of the invention, which is as set forth in the accompanying claims.

Having described our invention, we claim:

1. The process of producing an increased yield of tar-free carbon black acceptable to the rubber industry for compounding with a rubber selected from the group comprising natural rubber, and rubbery polymers obtained by polymerizing a conjugated diene, characterized by the fact that a standard chloroform extract of tar from said carbon black will transmit at least 85% as much light as the chloroform used will before the extraction, which comprises the steps of passing an axial stream of hydrocarbon in gaseous form surrounded by a helically moving blanket of hot gas into a reaction zone, which blanket of hot gas forms carbon black in said axial stream by pyrochemical reactions, and which hot blanket permits the amount of hydrocarbon in said axial stream to be greatly increased without substantial carbon deposits in said reaction zone, feeding said hydrocarbon into said reaction zone at a rate higher than that which will produce a maximum yield of said tar-free carbon black and said rate being so high that an increased yield of tarry unacceptable carbon black having an alkaline pH, the standard chloroform extract from which has less than 80% light transmission than said chloroform is produced over the amount of tar-free carbon black that could be produced in said reaction zone from the same weight of said hydrocarbon cooling said tarry black, and detarring and reducing the pH of said tarry carbon black by intimate mixing with, and exposure to, an oxidizing gas comprising free oxygen under an oxidizing temperature of from 400° F. to 1200° F. to produce said tar-free carbon black the light transmission of a standard chloroform extract of which is at least 85% of said chloroform in an increased yield per unit of hydrocarbon feed and per reaction zone over the yield of said tar-free carbon black that could be produced from said feed in said reaction zone.

2. The combination of claim 1 in which the axial stream of hydrocarbon comprises over 50 per cent of a gas oil comprising aromatic hydrocarbons to the extent of having an aniline number less than 150° F.

3. The combination of claim 2 in which the helically moving blanket of hot gas is formed by the complete combustion of a gas comprising over 50 per cent methane with air before contacting said axial stream.

4. The combination of claim 1 in which the axial stream of hydrocarbon comprises over 50 per cent of a gas oil having an aniline number of less than 150° F. and the helically moving blanket of hot gas is formed by combustion of a portion of the axial stream in air injected tangentially into said reaction zone.

5. The combination of claim 1 in which at least part of the detarring of the carbon black is by exposure to an oxidizing gas containing from 0.1 to 5 volume per cent of sulfur dioxide at a temperature between 300° F. and 400° F. and the loss of carbon black during detarring is less than 5 per cent.

6. A process of producing an increased yield of tar-free carbon black, characterized by the fact that a standard chloroform extract of tar from said carbon black will transmit at least 85% as much light as the chloroform used will before the extraction, which comprises the steps of passing an axial stream of hydrocarbon in gaseous form surrounded by a helically moving blanket of hot gas into a reaction zone, which blanket of hot gas forms carbon black in said axial stream by pyrochemical reactions, and which hot blanket permits the amount of hydrocarbon in said axial stream to be greatly increased without substantial carbon deposits in said reaction zone, feeding said hydrocarbon into said reaction zone at a rate higher than that which will produce a maximum yield of said tar-free carbon black and said rate being so high that an increased yield of tarry unacceptable carbon black the standard chloroform extract from which has less than 80% light transmission than said chloroform is produced over the amount of tar-free carbon black that could be produced in said reaction zone from the same weight of said hydrocarbon, and detarring said tarry carbon black to produce said tar-free carbon black in an increased yield per unit of hydrocarbon feed per reaction zone.

7. A process according to claim 6, in which the axial stream of hydrocarbon comprises over 50 per cent of a gas oil comprising aromatic hydrocarbons to the extent of having an aniline number less than 150° F.

8. A process according to claim 6, in which the helically moving blanket of hot gas is formed by the complete combustion of a gas comprising over 50 per cent methane with air before contacting said axial stream.

9. A process according to claim 6, in which the helically moving blanket of hot gas is formed by combustion of a portion of the axial stream in air injected tangentially into said reaction zone.

10. A process according to claim 6, in which an axial stream of vaporized gas oil surrounded by a helically moving blanket of hot combustion gas is passed into the reaction zone.

11. A process according to claim 10, in which the hot combustion gas is produced by completely burning a fuel in air before contact with said axial stream.

12. A process according to claim 10, in which the hot combustion gas is formed in the reaction zone by burning a portion of said axial stream with air injected tangentially into said reaction zone.

13. A process according to claim 6, in which the detarring of the carbon black is by exposure to an oxidizing gas under oxidizing temperature conditions and the loss of carbon black during detarring is less than the gain in carbon black from making tarry carbon black instead of tar-free carbon black.

14. The process according to claim 6, in which at least part of the detarring of the carbon black is by exposure to an oxidizing gas containing from 0.1 to 5 volume per cent of sulfur dioxide under oxidizing temperature conditions and the loss of carbon black during detarring is less than 5 per cent.

References Cited in the file of this patent

UNITED STATES PATENTS

| | | |
|---|---|---|
| Re. 22,886 | Ayers | June 3, 1947 |
| 1,285,363 | Pike | Nov. 19, 1918 |
| 2,238,576 | Heller et al. | Apr. 15, 1941 |
| 2,342,862 | Hemminger | Feb. 29, 1944 |
| 2,375,795 | Krejci | May 15, 1945 |
| 2,393,106 | Johnson et al. | Jan. 15, 1946 |
| 2,587,107 | Cade | Feb. 26, 1952 |

FOREIGN PATENTS

| | | |
|---|---|---|
| 83 | Great Britain | of 1886 |